United States Patent [19]

Lippold et al.

[11] Patent Number: 5,761,999
[45] Date of Patent: Jun. 9, 1998

[54] METHOD FOR DETECTING FILMS

[75] Inventors: Andreas Lippold, Nidderau; Christian Schlegel, Dietzenbach, both of Germany

[73] Assignee: MAN Roland Druckmaschinen AG, Germany

[21] Appl. No.: 729,178

[22] Filed: Oct. 11, 1996

[30] Foreign Application Priority Data

Oct. 11, 1995 [DE] Germany .............. 195 37 807.5

[51] Int. Cl.⁶ ........................................... B41F 3/04
[52] U.S. Cl. ............ 101/484; 101/351.1; 101/DIG. 45; 101/365; 250/559.1; 250/559.11; 250/559.27; 356/319; 356/381
[58] Field of Search ........................ 101/483, 484, 101/365, 351.1, DIG. 45; 356/369, 367–368, 381–382; 250/559.1, 559.11, 559.27

[56] References Cited

U.S. PATENT DOCUMENTS

| | | | |
|---|---|---|---|
| 3,623,818 | 11/1971 | Gardner et al. | 356/369 |
| 4,570,539 | 2/1986 | Rottstedt . | |
| 4,575,249 | 3/1986 | Grieger | 356/369 |
| 4,695,162 | 9/1987 | Itonaga et al. | 356/369 |
| 4,829,898 | 5/1989 | Wieland . | |
| 5,185,644 | 2/1993 | Shimoyama et al. | 356/369 |
| 5,483,346 | 1/1996 | Butzer | 356/369 |
| 5,517,312 | 5/1996 | Finarov | 356/382 |
| 5,552,890 | 9/1996 | Nanna et al. | 356/369 |
| 5,572,314 | 11/1996 | Hyman, Jr. et al. | 356/369 |

FOREIGN PATENT DOCUMENTS

| | | |
|---|---|---|
| 31 36 887 A1 | 3/1983 | Germany . |
| 33 31 208 | 3/1985 | Germany . |
| 36 28 464 | 3/1988 | Germany . |

*Primary Examiner*—Eugene H. Eickholt
*Attorney, Agent, or Firm*—Leydig, Voit & Mayer, Ltd.

[57] ABSTRACT

The invention relates to a method and device for detecting ink or lacquer films on metallic surfaces inside printing machines. In particular, to irradiate the surface with light and sensing of the intensity of the reflected light to detect whether an ink film or lacquer film on a roller has been completely removed by applying a metering element or doctor-blade element. This is achieved according to the invention by the irradiation of the metallic surface or of the film located thereon, and the reception of the light reflected from the surface or the film located thereon is performed at the Brewster angle with respect to the surface normal, the Brewster angle being defined by the refractive index of the material of the film to be determined and that liner polarization of the light is performed at least partially in the plane of incidence, at least in one of the two beam paths.

14 Claims, 4 Drawing Sheets

5,761,999

METHOD FOR DETECTING FILMS

TECHNICAL FIELD

The invention relates to a method and device for detecting ink films or lacquer films on a surface, and in particular, on a roller of a printing machine.

BACKGROUND OF THE INVENTION

In sheet-fed offset presses, ink is fed to a printing form via the rollers of the inking unit from an inking fountain cooperating with an inking fountain roller. In accordance with the inking requirements of the printing form, the thickness of the ink film varies among different spatial zones on the surface of the inking fountain roller. The thickness of an ink film is controlled using split or non-split ink knives, or ink metering elements. In particular, the ink metering elements are equipped to be remotely adjusted by positioning motors and integrated position sensors. This allows the ink feed to be set from a control console of the printing machine.

In order to calibrate the signals of the position sensor of an ink metering element for the desired thickness of the film layer on the ink fountain roller surface, it is necessary to establish the zero position of the ink metering element. This zero position is the position in which the element bears against the surface of the ink fountain roller; in other words, the position in which the ink metering element applies no ink to the roller. Conventionally, manual adjustment of each ink metering element to set is required its zero position, as is manual recalibration of its zero position from time to time. The values of the signals of the position sensors corresponding to each ink metering element at their respective zero position are stored as zero position values. Based on these zero position values, the desired signal values from the position sensors are derived for positioning the ink metering elements for the proper application of ink. However, such a procedure to determine the zero positions is very time consuming and inefficient because of the multiplicity of ink metering elements in the ink fountain, especially in the case of multi-color sheet-fed offset presses.

For example, Rottstedt U.S. Pat. No. 4,570,539, issued Feb. 18, 1996, describes a method for setting the position of ink metering elements in a printing machine. The ink fountain roller is divided into numerous zones. For each of these zones, the thickness of the film on the roller is sensed by means of a traversing densitometer. It is regarded as disadvantageous that both the fresh ink located on the ink fountain roller and the surface of the ink fountain roller exhibit glossy effects which particularly complicate the determination of the zero position of an ink metering element. Also, an ink-free doctor-blade surface, which is not permitted to have any contamination or soiling, is required for calibration of the zero position of the ink metering elements; and the densitometer must be manually positioned over this ink free zone.

As already known in the printing industry, densitometers generally have a zero/forty-five (0/45) degree geometry or a 45/0 degree geometry. This means that the measuring area is illuminated either perpendicularly or at a 45 degree angle and the light reflected from the measuring area either at 45 degrees or perpendicularly is fed to a photoelectric transducer. The placement of polarization filters in the optical beam path when using densitometers eliminates some erroneous measurements caused by fresh printing ink.

SUMMARY OF THE INVENTION

The primary object of the invention is to provide a new method and device to detect the presence of an ink film on a metallic surface that is reliable for all types of ink and lacquer films. It is a further object of the invention to reliably detect the zero ink (or lacquer) position on a rotating roller with no manual participation of the printing machine operator.

To this end, according to the primary aspect of the invention, the surface region of the roller, or any metallic surface on which the presence or absence of a film is to be detected, is irradiated with light at the Brewster angle with respect to the normal of the surface; and the light reflected from the surface of the film or of the roller is quantitatively sensed at the Brewster angle. In the beam path of the irradiation or reflection, a filter is placed to at least partially polarize the light in the plane of incidence. By illuminating and receiving polarized light at the Brewster angle, the method and device of the invention effectively eliminate extraneous light which can cause erroneous results, especially when the film to be detected is fresh and glossy or composed of ink and lacquer films which have a high transparency or are virtually completely transparent. The irradiation of the surface of the ink fountain roller and the reception of the light reflected, in conjunction with at least partial polarization of the light in the plane of incidence, produces a large change in the signal (i.e., a signal discontinuity) from the described measuring device when the ink or lacquer film is completely doctored off the surface of the ink fountain roller.

The light reflected from a surface is generally not completely polarized; that is, all its vibrations are not strictly in one plane. However, for each reflecting substance there is a certain angle of incidence for which the polarization is a maximum. This polarizing angle, the Brewster angle, is such that the reflected and the refracted rays are at right angles to each other. The Brewster angle varies depending on the optically refractive characteristics of the material of the ink or of the lacquer that is reflecting the applied light. If the ink or the lacquer located on the surface of the roller has the optical refractive index n, the generally known relationship holds for the Brewster angle $\beta$: $\tan \beta = n$.

A multiplicity of differently colored printing inks, transparent lacquers, or other fluids can be detected on metallic surfaces using the method and device according to the invention. The absence of ink can be used to indicate when a corresponding ink metering element is wiping the ink or the lacquer completely from the fountain surface. When using the invention with an ink fountain roller, a measuring device according to the invention is placed in each ink metering zone on a stretcher extending parallel to the ink fountain roller. The individual ink metering elements are then moved by the assigned remote control drives in the direction of the ink fountain roller, and the corresponding signals of the photoelectric transducers are evaluated by an evaluation circuit.

BRIEF DESCRIPTION OF THE DRAWINGS

Other objects and advantages of the invention will become apparent upon reading the attached detailed description and upon reference to the drawings in which.

While the invention has been described in connection with certain preferred embodiments, it will be understood that there is no intention to limit the invention to the embodiments shown, but it is intended, on the contrary to cover the various alternative and equivalent constructions included within the spirit and scope of the appended claims.

DETAILED DESCRIPTION OF THE INVENTION

Figure 1:
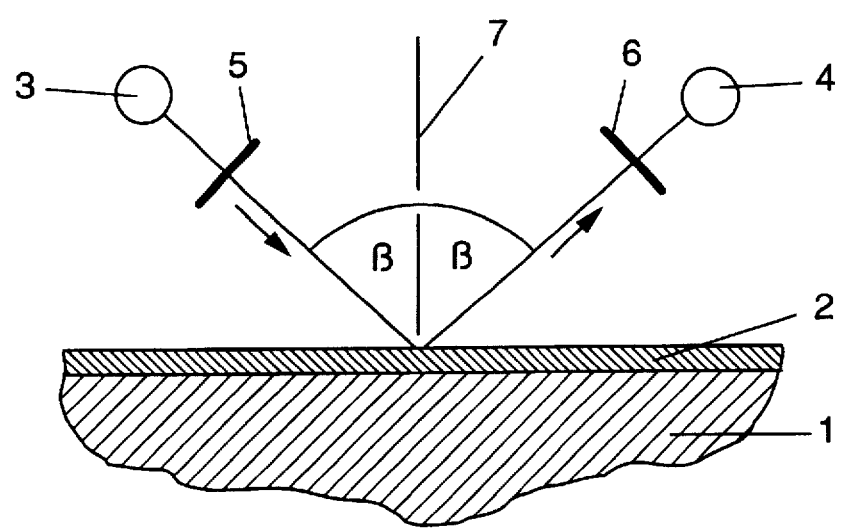
FIG. 1 is a schematic diagram illustrating the optical design of a preferred embodiment of the invention.

Turning now to the drawings, there is shown in FIG. 1 a detail of the surface of a metallic roller 1 constructed, for example, as an ink fountain roller. Located on the surface of this roller 1 is a film 2, composed of a lacquer or an ink, which is to be detected by the method and device disclosed by the invention. The material of the film 2 has a known optical refractive index n. The surface of the roller 1 and the film 2 located thereupon is irradiated at the Brewster angle β, where tan β=n, with respect to the surface normal 7 by a light source 3 designed, in the preferred embodiment, as an light emitting diode (LED). An opto-receiver 4, a photo-electric transducer in a preferred embodiment of the invention, is positioned at the Brewster angle β to detect the light reflected from the surfaces of the roller 1 or film 2. Light stops which are to be provided in the beam path are not represented in FIG. 1.

One or both polarization filters 5, 6 are arranged in the beam paths in accordance with the invention. Depending on the selected configuration, polarization filter 5 is placed in the beam path for illuminating the surface of the roller 1 or film 2, and/or polarization filter 6 is placed in the beam path for receiving the light reflected from the surface of the roller 1 or film 2. The polarization filters 5, 6 polarize the light in the plane of incidence. The plane of incidence is the plane containing both the irradiating and reflected light beams. In the drawings, the plane of incidence is taken as the plane of the paper.

The method and device described in the invention only require at least one polarization filter in light path from the light source 3 to the opto-receiver 4. Thus, either polarization filter 5 downstream of the opto-transmitter 3 in the illumination beam path or polarization filter 6 upstream of the opto-receiver 4 in the beam path for the purpose of receiving the reflected light (receiving beam path) is required. Furthermore, one or both of the polarization filters 5, 6 must at least partially polarize the light in the plane of incidence so that the electric field strength vectors lie in the plane of the drawing formed by the incident beam and reflected beam.

As long as there is a film 2 on the roller 1, some of the light radiated from the opto-transmitter 3 onto the film 2 penetrates into the film 2 accompanied by deflection of the light away from the direction of irradiation. Part of the beam is reflected from the surface of the film. Because the incident and reflected beams are at the Brewster angle, the portion of the incident beam penetrating into the film 2 is perpendicular to the reflected beam which results in the reflected light beam being polarized only perpendicular to the plane of incidence. Thus, as long as there is a film 2 on the roller, in conjunction with the geometry of illumination and opto-reception provided according to the invention, the film 2 is capable only of reflecting light which is polarized in a plane perpendicular to the plane of incidence.

Figure 2A:
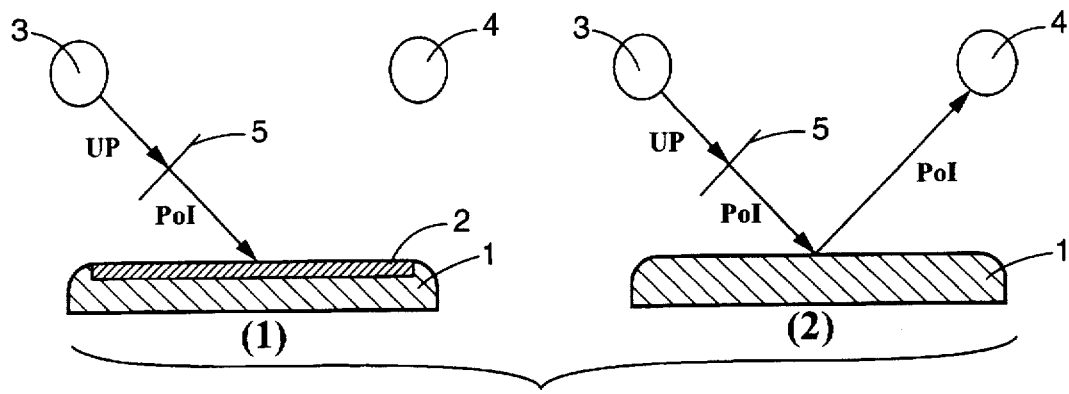
FIG. 2 is a series of schematic diagrams illustrating the different types of light reflected from the surface of an ink roller according to three alternative constructions, A, B, C, of the invention.
Figure 2B:
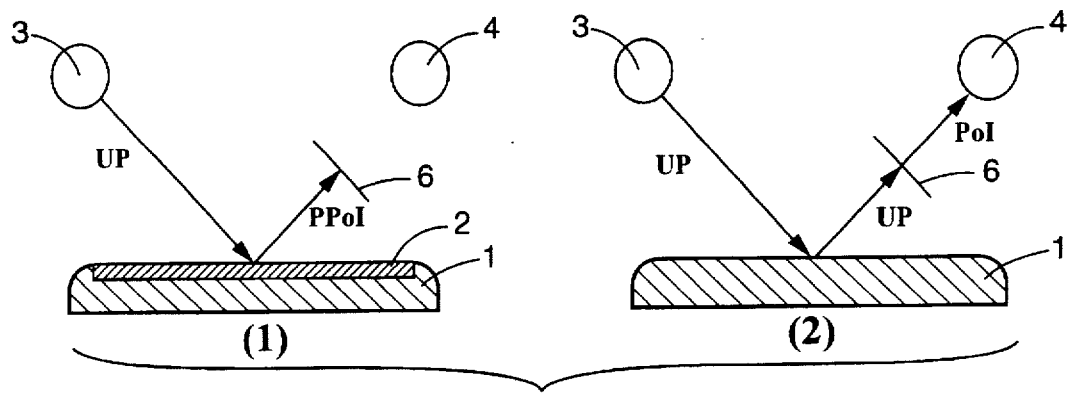
Figure 2C:
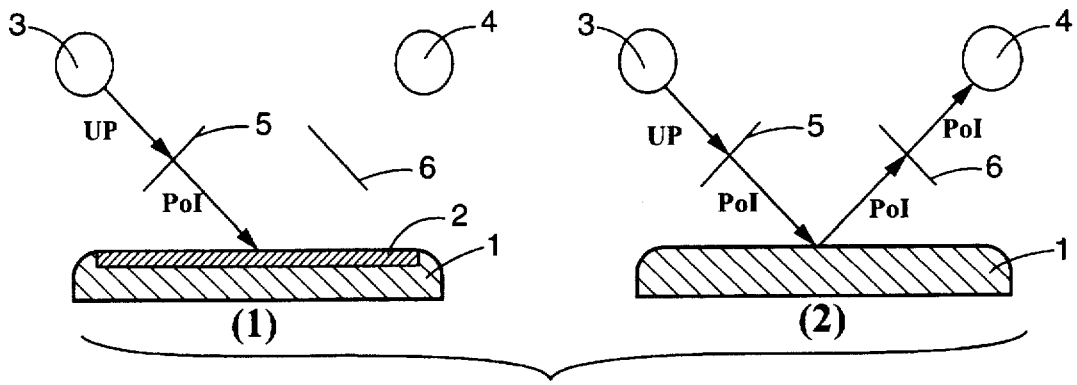

The effect of the use of the polarization filters 5, 6 in a beam path depends on whether a filter is placed in the illuminating or the receiving beam path. Different filter placement embodiments contemplated in accordance with the invention are shown in FIG. 2. FIG. 2A demonstrates the operation of the invention using a single polarization filter 5 placed in the illuminating beam path. FIG. 2B demonstrates the operation of the invention using a single polarization filter 6 in the receiving beam path. And FIG. 2C demonstrates the operation of the invention when both polarization filters 5, 6 are present. For each of these figures, part 1 illustrates the operation when there is an ink film 2 present on the roller 1 (e.g., in FIGS. 2A(1), 2B(1), and 2C(1)), and part 2 illustrates the operation when there is no ink film present on the roller 1 (e.g., in FIGS. 2A(2), 2B(2), and 2C(2)).

When a single polarization filter 5 is used in the illuminating beam path, no light is reflected into the opto-receiver 4 when there is film 2 on the roller 1 as illustrated in FIG. 2A(1). However, light will be reflected from the surface of the roller 1 and received by the opto-receiver 4 when no film 2 is present as illustrated in FIG. 2A(2).

The surface of the film 2 is irradiated at the Brewster angle with the light polarized in the plane of incidence by the polarization filter 5. However, the surface of the film 2 is able to reflect only light polarized perpendicular to the plane of incidence which has been previously filtered out. Therefore, no light is received at opto-receiver 4. Only, by applying an ink metering element or another doctor blade to reduce the thickness of the film 2 to zero (i.e., the surface of the roller 1 is clean), will the reflected light polarized by the polarization filter 5 be received by the opto-receiver 4. In such a case, it is then possible to extract a signal from the opto-receiver 4. However, as long as there is a film 2 on roller, the opto-receiver 4 does not receive any signal caused by irradiation, or the strength of the received signal is smaller by orders of magnitude than a signal received when there is a film 2 present.

Similarly, when a single polarization filter 6 is located upstream of the opto-receiver 4 in the receiving beam path, no light can be received by the opto-receiver 4 when there is a film 2 on roller 1 as illustrated in FIG. 2B(1). However, light will be reflected from the surface of the roller 1 and received by the opto-receiver 4 when there is no film 2 present as illustrated in FIG. 2B(2).

As long as there is a film 2 on roller 1, the irradiation of the surface of the film 2 at the Brewster angle produces a reflection of the light, the reflected light being polarized perpendicular to the plane of incidence. Since the polarization filter 6 upstream of the opto-receiver 4 passes the light components with a plane of polarization in the plane of incidence, only a small quantity of light, if any, reaches the opto-receiver 4. In a corresponding way, the signal which can be extracted from the opto-receiver 4 remains small in the case of a thickness of the film 2 different from zero. Only if an ink metering element of doctor blade has completely doctored off the film 2 on the roller allowing the metallic surface of the roller 1 to reflect the incident light, is the opto-receiver 4 capable of receiving and, consequently, emitting a signal. At the Brewster angle, the metallic surface of the roller 1 reflects the light independently of any direction of polarization.

It is also in accordance with the invention to place a polarization filter 5, 6 in both the illuminating and receiving beam paths. The polarization filters 5,6 and the reflections of light from the film 2 and surface 1 operate in the same manner as previously described in that no light can be received by the opto-receiver 4 when there is a film 2 on the roller 1 as illustrated in FIG. 2C(1). However, light will be reflected from the surface of the roller 1 and received by the opto-receiver 4 when there is no film 2 present as illustrated in FIG. 2C(2). It is essential that both polarization filters 5, 6 produce a polarization of the light in the direction defined by the plane of incidence. Furthermore, the polarization filters, individually or together, must not completely polarize the light in the irradiation or receiving beam paths. The higher the degree of polarization of the filters used, however, the better suited is the measuring method according to the invention for ink and lacquer films which have a high transparency or are virtually completely transparent. The reason for this is that not only does reflection, or reflection with simultaneous polarization occur at the surface of the film 2, but also, that the light penetrating into the film 2 is reflected at the interface between the film 2 and roller 1.

Figure 3:
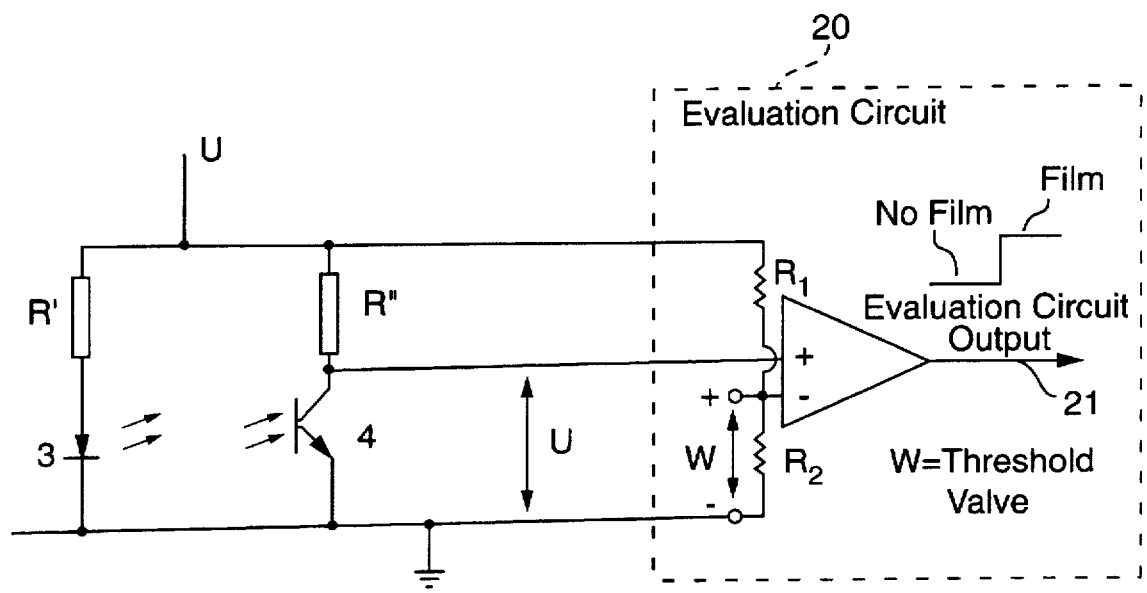
FIG. 3 is a circuit diagram of a light source and optoreceiver, which generates and detects the light reflected from the surface of the roller in FIG. 3 and outputs a signal indicating the presence of a film.

In both the illustrated embodiments of the invention, the light received at the opto-receiver 4 is converted to an output signal u in accordance with the disclosed invention by a circuit as shown in FIG. 3. The opto-transmitter 3 designed as a light-emitting diode (LED) is connected in series with a resistor R'. The opto-receiver 4 designed as a phototransmitter is likewise connected in series with a resistor R" at the receiver end. Two connections of the opto-receiver 4 and of the opto-transmitter 3 are connected to one another and are at the same potential, powered by a common supply voltage U via the resistors R', R". The output signal u corresponds to the light received by the opto-receiver 4. There is a large difference in the value of the output signal when no light is sensed by the opto-receiver 4 (corresponding to an ink film being present on the printing roller) and when light is sensed (corresponding to no ink film present on the printing roller as happens when the ink or lacquer film is completely doctored off the surface of the ink fountain roller).

The output signal u is sent to an evaluation circuit 20. The evaluation circuit compares the output signal u with a threshold value w to determine whether there is a film 2 on roller 1. In a preferred embodiment illustrated in FIG. 3, the evaluation circuit 20 comprises a common comparator circuit. The evaluation circuit 20 will produce an evaluation circuit output 21 which will be a high value when there is film 2 on roller 1, and a low value when there is not a film 2 present.

Figure 4:
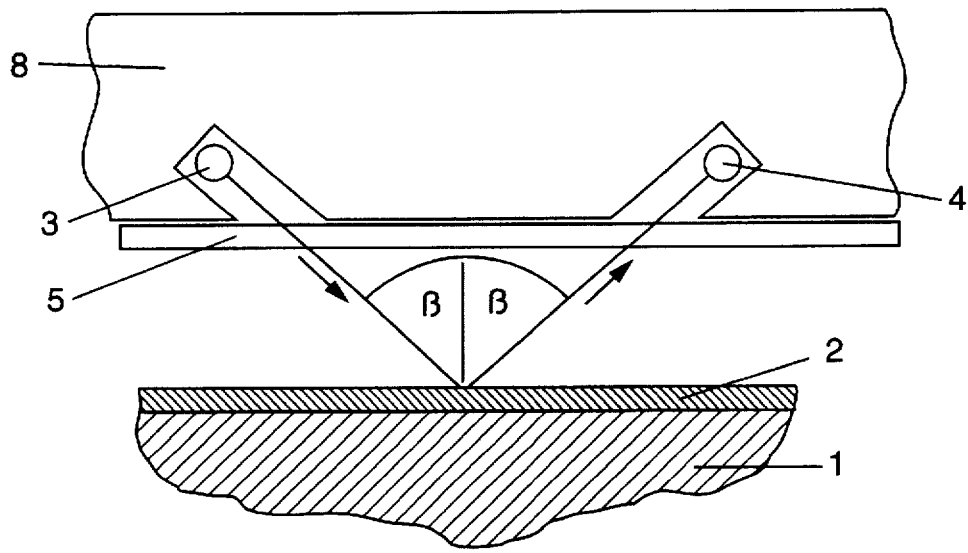
FIG. 4 is a schematic diagram of a compact preferred embodiment of the invention using the optical design shown in FIG. 1.

Turning now to FIG. 4, a compact preferred embodiment of the measuring device according to the invention is shown that operates as previously detailed when FIGS. 1 and 2 were described. The light-emitting diode (LED) of the opto-transmitter 3, and the opto-receiver 4 in the form of the phototransistor are arranged in channels extending at an angle to one another in a housing 8. The channels intersect at an angle corresponding to the measuring geometry provided, which is twice the value of the Brewster angle β determined by the material of the film 2. The underside of the housing 8 is sealed by a glass plate 9. The light emitted by the opto-transmitter 3 passes through the glass plate 9. Light reflected from the surface of the ink film 2 or roller 1 and received by opto-receiver 4 also passes through the glass plate 9. Additional polarization devices are not required in this preferred embodiment because the glass plate 9 performs the polarization of the light in the illumination and receiving beam path. The proportion of the light polarized by the glass plate 9 in the plane of incidence depends in this embodiment on the angle at which the light is radiated through the glass plate 9. For instance, if the glass has a refractive index n which is equal to the refractive index of the material of the film 2 on the roller 1, only light polarized in the plane of incidence passes through the glass plate 9.

Figure 5:
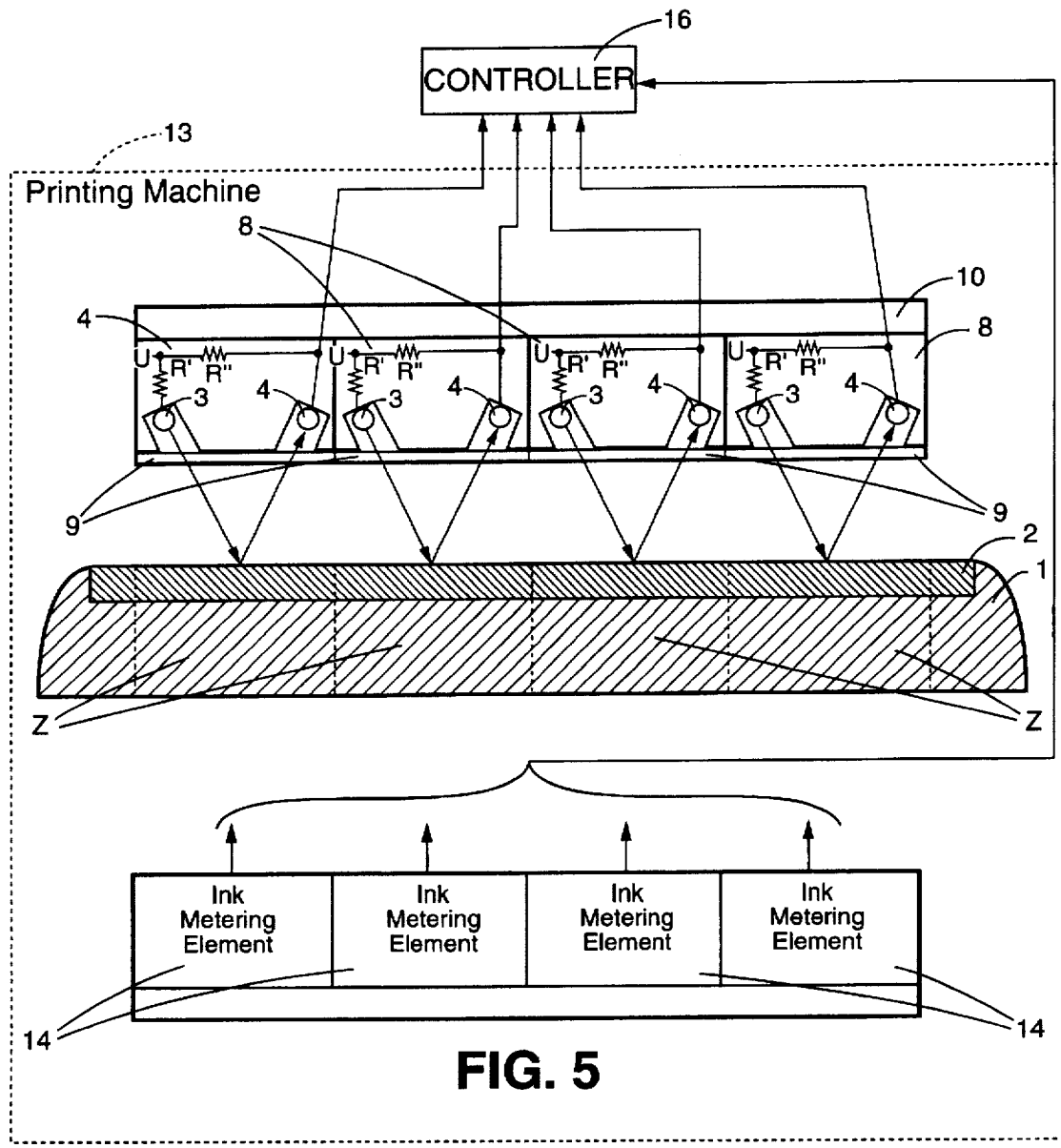
FIG. 5 is a schematic diagram showing a plurality of measuring devices according to the invention for an ink fountain roller with a plurality of ink metering zones.

Multiple measuring devices can be used with a printing machine whose ink fountain roller has a number of metering zones Z as shown in FIG. 5. The thickness of a film 2 is set in each of the individual spatial zones Z on the roller 1 by ink metering elements 14 in the form of ink slides, metering eccentrics, ink knives or other doctor-blade elements. The ink metering elements 14 assigned to the individual zones Z can be remotely controlled in this case by actuators. In particular, the ink metering elements 14 have position sensors from whose signal it is possible to extract the position of the ink metering element 14 relative to the surface of the roller 1 and thus also to extract the position for a desired thickness of film 2. First, however, the zero position of each ink metering element 14 must be determined via the method and device as described herein.

The individual housings 8 of each measuring device, in accordance with the invention, are mounted on a stretcher 10 extending parallel to the axis of the roller 1. The measuring devices thus lie in a plane in which the axis of the roller 1 also lies. The undersides of the housings 8, which are directed towards the surface of the roller 1, are sealed in the preferred embodiment, as detailed in the discussion of FIG. 4, by a glass plate 9. The glass plate 9 can be easily cleaned in the vent of any soiling. Also, in accordance with the invention, the embodiment shown in FIG. 5 can be further protected against mechanical damage by means of a cover in the form of profile or the like.

In order to determine the zero position values of the ink metering elements 14, all of the ink metering elements 14 are adjust and moved away from the roller 1 so that there is certainly a film differing from zero on the roller 1. An ink metering element is then gradually moved in the direction of the axis of roller 1 until the measuring device detects an increase in the light received by the opto-receiver 4 in the respective zone Z, because the completely doctored surface of the roller 1 reflects the light irrespective of its plane of polarization. The electric voltage tapped by the position sensor of the ink metering element 14, or the signal thereof, is relayed to the controller 16 which uses this value for future metering operations. This ink metering element 14 is then moved away again from the roller 1. This sequence of operations is repeated for each ink metering element 14.

From the foregoing, it will be appreciated that a new method and a device for detecting ink or lacquer films on metallic surfaces inside printing machines has been described. Using the method and device of the invention, the zero setting for each ink metering element of a printing machine can be automatically and reliably determined without manual intervention of the printing machine operator.

What is claimed is:

1. A method for detecting a film of a printing liquid on a surface in a printing machine, comprising the steps of: irradiating the surface with light over an illumination beam path for producing a reflection of light over a reception beam path at a Brewster angle with respect to the normal of the surface; at least partially polarizing the light in the incident plane in at least one of the two beam paths; receiving the light reflected from the surface over the reception beam path; evaluating the intensity of the received light at the receptor; and determining the presence of the film when a substantial absence of light is detected by comparing the evaluated intensity of light to a predetermined threshold value.

2. The method according to claim 1, wherein the light is polarized in at least one of the two beam paths.

3. The method according to claim 1, wherein the light is polarized in the illumination beam path.

4. The method according to claim 1, wherein the light is polarized in the reception beam path.

5. The method according to claim 1, further comprising the step of:

determining if a ink metering element lies on the surface of a printing liquid roller by comparing the evaluated intensity of light to a predetermined threshold value.

6. A device for detecting a film of a printing liquid on a surface in a printing machine, comprising: an illumination source for irradiating the surface with light over an illumination beam path at the Brewster angle with respect to the surface normal; a receptor for receiving the light reflected from the surface over a reception beam path at the Brewster angle with respect to the surface normal; at least one polarization filter situated in at least one of the two beam paths for partial linear polarization of the light in the incident plane; and a light intensity evaluating circuit for evaluating the intensity of the light received at the receptor indicating the presence of the film of the printing liquid when a substantial absence of light is detected as determined by the intensity of light falling below a predetermined threshold value.

7. The device of claim 6, wherein the polarization filter is situated in the illumination beam path.

8. The device of claim 6, wherein the polarization filter is situated in the reception beam path.

9. The device of claim 6, further comprising:

an adjustable ink metering element, a printing liquid roller cooperating with the adjustable ink metering element, wherein the light intensity evaluator determines if the ink metering element lies on the surface of the printing liquid roller.

10. The device of claim 9, wherein the polarization filter is situated in the illumination beam path.

11. The device of claim 9, wherein the polarization filter is situated in the reception beam path.

12. A method for detecting a film of a printing liquid on a surface in a printing machine, comprising the steps of:

irradiating the surface with light over an illumination beam path for producing a reflecting of light over a reception beam path at a Brewster angle with respect to the normal of the surface;

at least partially polarizing the light in the incident plane in the reception beam path;

receiving the light reflected from the surface over the reception beam path;

evaluating the intensity of the received light at the receptor; and determining the presence of the film by comparing the evaluated intensity of light to a predetermined threshold value.

13. The method according to claim 12, further comprising the step of:

determining if an ink metering element lies on the surface of a printing liquid roller by comparing the evaluated intensity of light to a predetermined threshold value.

14. The method according to claim 12, further comprising the step of:

controlling an ink metering element in response to the comparison of the evaluated intensity of light to a predetermined threshold value.

* * * * *